July 10, 1928. 1,676,386

E. W. DAVIS

LUBRICATING SYSTEM

Filed Feb. 21, 1924

Inventor
Ernest W. Davis

William Bradbury
McCabb & Pierce
Attys.

Patented July 10, 1928.

1,676,386

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed February 21, 1924. Serial No. 694,379.

My invention relates to improvements in lubricating systems, and is particularly concerned with improvements in that type of lubricating system comprising a plurality of fittings, each of which is adapted to be secured to a bearing of the mechanism to be lubricated, and a compressor for supplying lubricant under pressure to the fittings, the compressor being provided with means for successively effecting sealed connection with the several fittings.

The objects of my present invention are:

First, to provide a lubricating system of the character described, by means of which lubricant can be easily and quickly forced into the fittings under high pressure;

Second, to provide a lubricating system of the character described, in which the pressure upon the lubricant is developed by a movement of the compressor relative to the fitting;

Third, to provide a lubricating system of the character described, in which the compressor and the fittings have co-acting parts for placing the lubricant supplied to the fittings under pressure;

Fourth, to provide a system such as described above, comprising a sealing element for effecting a sealed connection between the compressor and any of the various fittings, the sealing device also acting as a plunger for placing the lubricant under pressure;

Fifth, to provide a lubricant compressor comprising a reservoir and a cylinder communicating therewith, and means movable in the cylinder and capable of producing a vacuum in said cylinder for automatically withdrawing the lubricant from the reservoir or supply chamber, and thus priming the high pressure cylinder;

Sixth, to provide a lubricant compressor comprising a barrel having a piston floating therein for displacing the lubricant from the barrel, and means for easily removing the piston from the barrel; and Seventh, to provide a lubricating system of the character described, which is simple in construction, economical to manufacture, and easy to operate.

Figure 1:
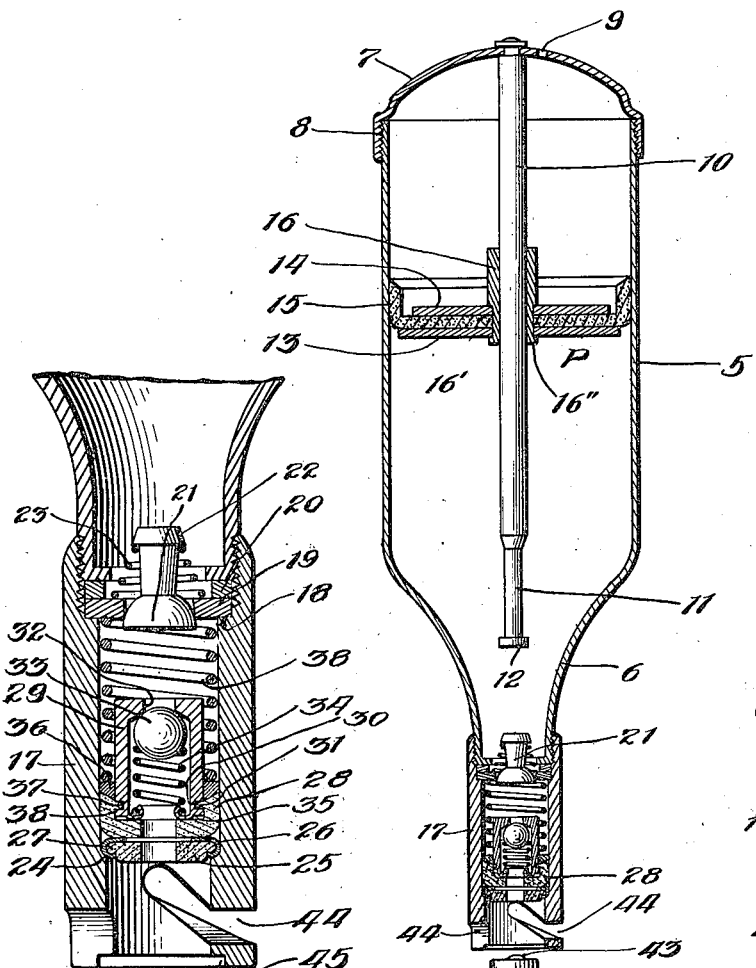
Figure 3:
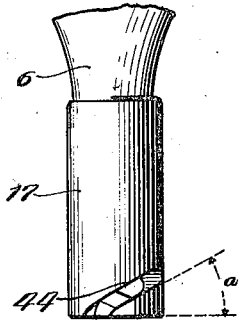
Figure 2:
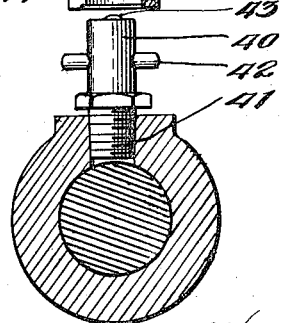

Other objects of my invention will appear as this description progresses, reference being had to the accompanying drawings, in which Figure 1 is a central longitudinal section through the compressor forming a part of my improved lubricating system, the fitting forming a part of such system being shown in elevation;

Figure 2 is a central longitudinal section through the coupling and high pressure cylinder of my improved compressor, this view being on a larger scale than Figure 1, and Figure 3 is a side elevation of the coupling member and high pressure cylinder intended to show the shape of the entry portion of the bayonet slots.

Throughout the several views, similar reference characters will be used for referring to similar parts.

The compressor forming a part of my novel lubricating system comprises the cylindrical barrel 5 which tapers at one end, as shown at 6, and the other end of which is provided with a removable cap 7 which may be secured to the open end of the barrel by a suitable threaded connection 8. Cap 7 has a suitable vent opening 9 formed therein. A rod 10 has its outer end riveted to the cover 7 and extends inwardly substantially the entire length of the barrel 5. This rod is reduced in cross section adjacent to its inner end, as shown at 11, and terminates in a head 12, one side of which is flattened. A piston P is slidably mounted upon the rod 10. This piston comprises the face plate 13, the follower plate 14 and the cup leather 15, which is clamped between the two plates 13 and 14. These plates are secured to the reduced end portion 16' of the sleeve 16 by swedging over the end of the sleeve as shown at 16''. The flange of the cup leather 15 is directed outwardly, as shown in Figure 1, so as to provide an effective seal against the entrance of air to the chamber formed by the piston and that portion of the barrel 5 lying between the piston and its tapered end.

A sleeve 17 has one end threaded onto the tapered end 6 of the barrel 5. This end of the sleeve is counterbored to form a shoulder 18 between which and the tapered end of the barrel 5 is clamped a washer 19 and the gasket 20. The opening in the washer 19 forms a seat for the outwardly opening check valve 21, the stem of which projects loosely through the opening in the washer 19 and terminates in a head 22 small enough to pass through the same opening. A spiral spring 23 confined between the washer 19 and the head 22 tends to keep the valve 21 in its closed position. The spiral spring 23 is a comparatively light spring so as to exert but very little pressure upon the valve 21.

The bore of the sleeve 17 is further counterbored throughout a greater portion of its length to provide a shoulder 24 which acts as a stop for the sealing member comprising the leather washer 25 and the metal ring 26 which encases the outer edge of the washer 25. The flange of the ring 26 is turned over the edge of the washer, as shown at 27, so as to prevent the washer 25 from dropping out of the sleeve 17.

A cup leather 28 is slidably mounted in the sleeve 17 with its bottom abutting the ring 26. The metal of which the ring 26 is made is comparatively thin so that when lubricant pressure is exerted upon the cup leather, the bottom of the cup leather will be held in contact with the inner side of the leather washer 25, as will be referred to later on.

A cylindrical displacer 29 has its outer end inserted in the cup leather 28. An annular groove 30 extends around the outside of the outer end of the displacer 29 for receiving a bead 31 which is formed on the cup leather when pressure is exerted thereon during the use of the compressor. This bead tends to interlock the displacer and the cup leather so that they will act as a unit. The displacer 29 is hollow and cylindrical in form, as shown in Figure 2, and is provided at its inner end with an opening 32 which forms a seat for the check valve 33. This check valve is yieldingly held in its closed position by means of a compression spring 34 confined between it and the inturned flange 35 at the outer end of the displacer.

A ring 36 surrounds the displacer 29 and rests upon the edge of the flange of the cup leather 28. The outer face of this ring is beveled, as shown in Figures 1 and 2, to contact with the beveled edge of the cup leather, as shown at 37, so that when pressure is exerted upon the ring 36, it will tend to crowd the flange of the cup leather outwardly against the walls of the bore of the sleeve or cylinder 17 and prevent the escape of lubricant therefrom.

A compression spring 38 is confined between the ring 36 and the washer 19, and tends to hold the ring 36, and consequently the cup leather 28 and the displacer 29, in their outermost positions.

My improved compressor is designed to be used with a fitting comprising the cylindrical portion 40 which is threaded at one end, as shown at 41, to enable it to be attached to a bearing to be lubricated, and which has one or more pins or projections 42 extending from the sides thereof. Preferably, the fitting is provided with a ball closure 43 which is yieldingly held in closed position by means of a spring, not shown. The details of construction of the particular fitting referred to are well known to those skilled in this art, and further description thereof is, for that reason, unnecessary.

The outer end of the sleeve 17 is provided with inclined bayonet slots 44 corresponding in number to the number of pins or projections 42 extending from the fitting. I have found that good results are obtained when the angle $a$, that is, the angle between the sides of the bayonet slots 44 and the plane defining the outer end of the sleeve 17, is approximately 20°, and also that it is better to make the entry portions of the slots substantially parallel with the axis of the compressor so as to prevent the bending or breaking off of the points that would otherwise be formed by continuing the outer sides of the slots until they meet the end of the sleeve or coupling member. It is also desirable to make the slots 44 somewhat wider than the diameter of the pins or projections 42.

I prefer to counterbore the outer end of the sleeve, as shown at 45, to assist the operator in bringing the end of the sleeve 17 in the proper position for receiving the end of the fitting. It should also be noted that the inner ends of the slot or slots 44 terminate in the plane of the outer face of the washer 25.

In operating my improved lubricating system, the cover 7 is first unscrewed from the barrel 5 and then made use of as a handle for pulling the rod 10 from the barrel 5. As the rod 10 is pulled outwardly, the reduced portion 11 thereof will be pulled into the sleeve 16 so that air can pass between the sleeve 16 and the reduced portion 11 of the rod, and into the chamber formed by the piston P and the opposite end of the compressor. This prevents the formation of a vacuum in the barrel as the piston P is withdrawn, and consequently expedites the withdrawal of the piston. The barrel is then filled with grease or oil, or any other suitable fluid or plastic lubricant, and the piston P, rod 10, and cap 7 replaced, thus leaving the piston P resting upon the lubricant at the outer end of the barrel. The operator then places the open end of the sleeve over the end of the fitting 40, and rotates the same until the slots 44 receive the pins 42. In this position, the end of the fitting 40 contacts with the washer 25. The operator then turns the barrel of the gun in the necessary direction to cause the fitting to be moved into the sleeve 17 by the coaction of the pins 42 and the slots 44. As the fitting moves into the sleeve 17, the washer 25, cup leather 28 and displacer 29 are forced inwardly, thereby displacing the contents of the sleeve 17. The cup leather, displacer, and spring 38 are so designed and positioned relatively to each other that when the pins 42 engage the inner ends of the slots 44, the elements just recited substantially completely displace the entire contents of the sleeve 17. It will, of course, be understood that during the inward movement of the cup leather 28, the valve 21 will be closed due to the pressure created in the sleeve 17, and to the tension in the spring 23.

When the pins 42 engage the ends of the slots 44, the operator reverses the direction of rotation of the gun barrel so as to again bring the pins 42 to the outer ends of the slots 44. Thereupon, he repeats the process just described, and in this manner causes repeated reciprocations of the washer 25, cup leather 28 and displacer 29 in the sleeve or cylinder 17. It will, of course, be apparent that as these three elements move outwardly under the tension of the spring 38, the check valve 33 will be closed under the tension of the spring 34 so that no air can enter the sleeve 17 through the opening 32. Consequently, as the washer, cup leather and displacer move outwardly, a vacuum or at least a partial vacuum will be created in the sleeve or cylinder 17 so that atmospheric pressure impressed upon the outer face of the piston P will cause the latter to move downwardly, and thereby displace the lubricant from the cylinder 5 into the sleeve or cylinder 17, thereby substantially filling the latter and placing it in condition to discharge lubricant through the opening 32 and the registering openings in the cup leather and washer 25, into the fitting.

It will, of course, be apparent that as the pressure on the lubricant confined between the cup leather and the valve 21 increases, due to the inward movement of the cup leather and the associated elements, the bottom of the cup leather will bulge outwardly under the pressure of the lubricant, and cause the washer 25 to be held tightly in contact with the end of the fitting, and this contact will become greater as the pressure upon the lubricant increases. It should also be noted that as the washer 25 moves inwardly under the influence of the fitting, an annular space will be created between the end of the fitting and the wall of the large bore of the sleeve 17 into which the peripheral portions of the cup leather 28 might be crowded under the enormous pressure to which it is subjected. This action is, however, prevented by the metal washer 26 which is sufficiently stiff to resist the pressure imposed upon it.

By means of the construction described above, it is a comparatively easy matter to obtain pressures up to one or two thousand pounds per square inch, and higher pressures may be produced by greater effort on the part of the operator. My improved compressor is comparatively simple in construction and operation, and economical to manufacture.

This application is a continuation in part of my co-pending application, Serial Number 621,715, filed December 20, 1923.

While I have described the details of construction of the preferred embodiment of my invention, it is to be clearly understood that it is not limited to these details of construction, but is capable of other adaptations and modifications within the scope of the appended claims.

Having thus described my invention, what I claim as new and desire to secure by Letters Patent of the United States is:

1. A lubricant compressor comprising a barrel having a removable cap at one end, a rod secured to said cap and extending inwardly into said barrel, a portion of said rod adjacent to its inner end being reduced in diameter, a piston slidably mounted on said rod, a sleeve secured to the other end of said barrel and communicating therewith, said sleeve forming a high pressure cylinder, a valve seat clamped between said sleeve and barrel, an outwardly opening valve coacting with said seat, a flexible washer slidably mounted in said sleeve, a metal ring encasing the edge of said washer, a cup leather having its bottom abutting said washer, a displacer having one end positioned in said cup leather, an outwardly opening valve in said displacer, a second ring surrounding said displacer and bearing against the edge of said cup leather, and a compression spring abutting said valve seat and said second ring.

2. A lubricant compressor comprising a barrel having a removable cap at one end, a rod secured to said cap and extending inwardly into said barrel, a piston slidably mounted on said rod, a sleeve secured to the other end of said barrel and communicating therewith, said sleeve forming a high pressure cylinder, a valve seat between said sleeve and barrel, an outwardly opening valve coacting with said seat, a flexible washer slidably mounted in said sleeve, a metal ring encasing the edge of said washer, a cup leather having its bottom abutting said washer, a displacer having one end positioned in said cup leather, an outwardly opening valve in said displacer, a second ring surrounding said displacer and bearing against the edge of said cup leather, and a compression spring abutting said valve seat and said second ring.

3. A lubricant compressor comprising a barrel having a removable cap at one end, a rod secured to said cap and extending inwardly into said barrel, a piston slidably mounted on said rod, a sleeve secured to the other end of said barrel and communicating therewith, said sleeve forming a high pressure cylinder, a valve seat between said sleeve and barrel, an outwardly opening valve co-acting with said seat, a flexible washer slidably mounted in said sleeve, a metal ring encasing the edge of said washer, a cup leather having its bottom abutting said washer, a displacer having one end positioned in said cup leather, an outwardly opening valve in said displacer, and a spring for moving said cup leather outwardly.

4. A lubricant compressor comprising a coupling member having a bore, the outer end of which is smaller in diameter than the inner portion thereof, a cup leather slidably mounted in said bore, and a washer abutting the bottom of said cup leather and having reinforcing means at its periphery.

5. A lubricant compressor comprising a barrel having an open end and a cap for closing said end, a rod secured to said cap and projecting into said barrel, the inner end of said rod being reduced in diameter, a piston floating in said barrel and guided by said rod, and means at the inner end of said rod for engaging said piston to enable its removal from said barrel.

6. A lubricant compressor comprising a barrel having a removable cap at one end thereof, a piston floating in said barrel, and common means connected with said cap for venting the inner side of said piston to the outer side and for removing said piston from said barrel.

7. A lubricant compressor comprising a barrel having a cap for closing one end, a piston floating in said barrel and preventing passage of air toward the other end, and means carried by said cap for venting the inner side of said piston to the outside of said piston.

8. A compressor comprising a compression cylinder, a fixed diaphragm at the intake end of said cylinder, a movable diaphragm, spring means normally holding said movable diaphragm at the opposite end of said cylinder, and an outwardly opening check valve in each diaphragm, said movable diaphragm comprising means for making sealed contact with an operating member.

9. A compressor comprising a compression cylinder, a fixed diaphragm at the intake end of said cylinder, a movable diaphragm, spring means normally holding said movable diaphragm at the opposite end of said cylinder, and an outwardly opening check valve in each diaphragm, said cylinder having cam means for drawing a plunger into itself to compress its contents.

10. The combination with a receiving fitting, of a compressor comprising a lubricant containing barrel, a cylinder receiving lubricant from said barrel and telescoping over said fitting, means for maintaining a seal between the side wall of said cylinder and the end of said cylinder during relative axial movement of said cylinder and fitting, check valves, one between said barrel and cylinder and another carried by said sealing means, and spring means for pressing said sealing means outwardly, whereby during inward telescoping movement said fitting operates as a piston to compress and expel lubricant trapped by said first mentioned check valve, and upon separation of said fitting and cylinder, said sealing means operates as a piston to suck more lubricant into the cylinder.

11. A lubricant compressor comprising a barrel having a cap for closing one end thereof, a rod rigidly secured to said cap and having a portion of reduced diameter at its inner end, and a piston freely slidable on said rod and in sealing contact with the walls of said barrel, said piston and rod providing a passage for air when the piston is at the portion of said rod which is of reduced diameter.

12. In lubricating apparatus of the class described, a lubricant compressor having coupling means for effecting a quick detachable connection with a lubricant receiving nipple, said coupling means include a conduit member having locking means associated therewith for forming a mechanical connection with said nipple, an apertured gasket slidable in said conduit member, a shoulder for limiting outward movement of said gasket, a tubular member slidable in said conduit member and adapted to be pressed against said gasket by the pressure of the lubricant, said tubular member having a lubricant passage therethrough, an inlet end formed as a valve seat and an outlet end formed as a spring abutment, a valve for cooperating with said seat, and a spring confined between said valve and said spring abutment.

13. In lubricating apparatus of the class described, a lubricant compressor having coupling means for effecting a quick detachable connection with a lubricant receiving nipple, said coupling means comprising a sleeve having means associated therewith for interlocking with said nipple, a gasket slidable in said sleeve and adapted to form a lubricant pressed seal with said nipple, a valve cage slidable in said sleeve, an outwardly opening check valve in said valve cage, and a second gasket associated with said valve cage.

14. In lubricating apparatus of the class described, coupling means for effecting a quick detachable connection between a source of luricant under pressure and a nipple adapted to receive lubricant, said coupling means including a sleeve, locking means for effecting a mechanical connection between said sleeve and said nipple, slidable sealing means for effecting a lubricant pressed seal with said nipple, said sealing means having a passage therethrough, and an outwardly opening check valve in said means normally closing said passage.

15. In lubricating apparatus of the class described, a lubricant compressor comprising a barrel forming a lubricant reservoir, a piston slidable in said reservoir, a sleeve connected to said reservoir and communicating with the interior thereof, a check valve for permitting lubricant to pass from said reservoir to said sleeve and preventing return flow from said sleeve to said reservoir, coupling means associated with said sleeve for drawing a lubricant receiving nipple into said sleeve to thereby force lubricant into said nipple at high pressure, means carried by said sleeve for effecting a lubricant-tight seal with said nipple, and valve means adjacent said sealing means.

In witness whereof, I hereunto subscribe my name this 28th day of February, 1924.

ERNEST W. DAVIS.